United States Patent
Cahalan et al.

(10) Patent No.: US 8,279,936 B1
(45) Date of Patent: Oct. 2, 2012

(54) METHOD AND APPARATUS FOR FRACTIONAL PIXEL EXPANSION AND MOTION VECTOR SELECTION IN A VIDEO CODEC

(75) Inventors: Timothy R. Cahalan, Austin, TX (US); Christopher T. Foulds, Austin, TX (US); Moinul H. Khan, San Diego, CA (US)

(73) Assignee: Marvell International Ltd. (BM)

( * ) Notice: Subject to any disclaimer, the term of this patent is extended or adjusted under 35 U.S.C. 154(b) by 965 days.

(21) Appl. No.: 12/331,879

(22) Filed: Dec. 10, 2008

Related U.S. Application Data

(60) Provisional application No. 61/007,108, filed on Dec. 11, 2007.

(51) Int. Cl.
*H04N 7/12* (2006.01)
(52) U.S. Cl. .................................................. 375/240.24
(58) Field of Classification Search .............. 375/240.24
See application file for complete search history.

(56) References Cited

U.S. PATENT DOCUMENTS

| | | | |
|---|---|---|---|
| 6,983,080 B2* | 1/2006 | Wenstrand et al. | 382/284 |
| 2003/0215016 A1* | 11/2003 | Nishibori et al. | 375/240.16 |
| 2005/0238103 A1* | 10/2005 | Subramaniyan et al. | 375/240.16 |

* cited by examiner

*Primary Examiner* — Christopher Brown

(57) ABSTRACT

In accordance with the teachings described herein, systems and methods are provided for identifying a block of pixel data in a reference frame. The system may include a data fetch, a shift register, and one or more processing blocks. The data fetch may receive a best fit integer block, where the best fit integer block is identified by comparing the current block of pixel data to a search area within a reference block of pixel data. The shift register may be configured to load pixel data to be used for performing a fractional pixel expansion for one quadrant corresponding to each integer pixel in a block of pixel data, the block of pixel data including the best fit integer block plus one additional row of integer pixels and one additional column of integer pixels, wherein a combination of all of the one quadrant fractional expansions provides a plurality of fractional blocks for the best fit integer block. The one or more processing blocks may be configured to compare each of the plurality of fractional blocks with the current block to identify a best fit fractional block, the best fit fractional block being the best fit pixel match with the current block.

15 Claims, 11 Drawing Sheets

A aa B

C bb D

E F

| G | a | b | c | H |
|---|---|---|---|---|
| d | e | f | g | t |
| h | i | j | k | m |
| n | p | q | r | u |
| M | v | s | w | N |

I J cc dd ee ff

K L P Q

R gg S

T hh U

METHOD AND APPARATUS FOR FRACTIONAL PIXEL EXPANSION AND MOTION VECTOR SELECTION IN A VIDEO CODEC

CROSS-REFERENCE TO RELATED APPLICATIONS

This application claims priority from U.S. Provisional Patent Application No. 61/007,108, filed on Dec. 11, 2007, and entitled "Method and Apparatus for Fractional Pixel Expansion and Motion Vector Selection in a Video Codec," the entirety of which is incorporated herein by reference.

FIELD

The technology described in this patent document relates generally to video processing. More particularly, systems and methods are disclosed for efficient fractional pixel expansion in a video encoder motion estimation engine.

BACKGROUND

FIG. 1 is a block diagram of a typical video encoder 30 having a motion estimation engine 32. The motion estimation engine 32 encodes the incoming video signal 34 using intra-coded frames (I-Frames) 36 to generate one or more predictive-coded frames (P-Frames) 38. An I-Frame 36 is typically generated by compressing a single frame of the incoming video signal 34. The P-Frame 38 then provides more compression for subsequent frames by making reference to the data in the previous frame instead of compressing an entire frame of data. For instance, a P-Frame 38 may only include data indicating how the pixel data has changed from the previous frame (Δ Pixels) and one or more motion vectors to identify the motion between frames.

In order to generate a P-Frame 38, the motion estimation engine 32 typically compares blocks of pixel data from the current frame 40 with blocks of data from a previously generated frame of data, referred to as the reference frame 42. The motion estimation engine 32 attempts to find the best fit pixel match between each block in the current frame 40 and each block in the reference frame 42. In this way, the P-Frame only needs to include the small pixel difference (Δ Pixels) between the matched blocks and a motion vector to identify where the block was located in the reference frame 42. An example of this process is further illustrated in FIGS. 2A-2C.

FIG. 2A depicts an example block 50 within a current frame 52 of pixel data. Also shown in FIG. 2A is a predicted motion vector (PMV) 54 that provides an estimate of where the block 50 was likely located in the reference frame. As illustrated, a motion vector 54 typically points from a corner pixel of the current block 50 to a corner pixel of the reference block 56. Methods for calculating a predicted motion vector (PMV) 54 are known in the art and are beyond the scope of the instant application.

Based on the predicted motion vector (PMV) 54, a search area 60 is selected within the reference frame 62, as illustrated in FIG. 2B. As shown, the search area 60 may include all of the blocks surrounding the reference block 56 identified by the predicted motion vector (PMV) 54. The current block 50 is then compared with reference blocks at every pixel location within the search area 60 in order to identify the motion vector location within the search area 60 with the closest pixel match. This comparison is typically performed by calculating a sum of absolute differences (SAD) for each motion vector location within the search area 60, and selecting the motion vector location with the lowest SAD as the best match. It should be understood that other functions, such as motion vector cost, may also be used in this motion vector selection process.

FIG. 2C shows an example of a reference block 63 that has been identified from the search area 60 as being the closest pixel match with the current block. The reference block is identified by a motion vector 65 that points to the integer pixel location 64 in the upper left corner of the reference block 63. The identified reference block 63 includes an array of integer pixels (e.g., 4×4, 16×16, etc.) that most closely matches the array of pixels in the current block.

A more precise match to the current block can be obtained by performing a fractional pixel expansion around the integer pixels in the reference block 63 and then comparing the resultant fractional blocks with the current block to identify the closest match. Fraction movement on the integer pixels is done by shifting the entire block of integer pixels up, down, left, and right in fractional increments in order to find a better match with the current source block than the integer pixels provided. FIG. 3 illustrates an example of a fractional pixel expansion 300 of an integer pixel 301. In this example, the integer pixel 301 has been expanded to its quarter 302 and half 303 pixel locations. As shown, this results in forty-eight half and quarter pixels 302, 303 for each integer pixel (the number may vary depending on the video standard). By performing this fractional pixel expansion on each integer pixel in the identified reference block 63, there are resultant forty-eight fractional blocks that may be compared with the current block in order to define a more precise motion vector. This process is commonly referred to as fractional motion estimation.

Typically, fractional motion estimation is performed by processing one integer pixel location in the reference block at a time to generate the fractional pixel data and to accumulate partial SAD values. After all of the fractional pixel locations have been processed, the resulting forty-nine (48 fractional and one integer) SADs (or fewer, depending on the video standard) are compared and the fractional motion vector with the lowest SAD is selected. A disadvantage of this approach is that it results in many of the fractional pixel expansions being performed multiple times. For example, a (neg x, pos y) expansion for a particular integer pixel will include most of the same fractional pixels as a (neg x, neg y) expansion of the integer pixel below it, thus wasting clock cycles and memory accesses.

SUMMARY

In accordance with the teachings described herein, systems and methods are provided for identifying a block of pixel data in a reference frame. A method for identifying a block of fractional pixel data in a reference frame that is a best fit pixel match with a current block of pixel data in a current frame may include the following steps: comparing the current block of pixel data to a search area within a reference block of pixel data to identify a best fit integer block; for each integer pixel in a block of pixel data that includes the best fit integer block plus one additional row of integer pixels and one additional column of integer pixels, performing a fractional pixel expansion for one quadrant corresponding to each integer pixel in the block of pixel data, such that a combination of all of the one quadrant fractional pixel expansions provides a plurality of fractional blocks for the best fit integer block; and comparing each of the plurality of fractional blocks to the current block to identify a best fit fractional block, the best fit fractional block being the best fit pixel match to the current block.

In certain embodiments, the method may also include the fractional pixel expansion being performed on one row of the block of pixel data at a time. In the one row of the block of pixel data, a comparison of each of the plurality of fractional blocks to the current block may be performed by comparing pixel data in the current block with fractional pixels. The method may further include the comparison of each of the plurality of fractional blocks to the current block resulting in one or more difference values for each fractional pixel that are stored with information identifying a location of the fractional pixel within the block of pixel data and associating the one or more difference values with particular ones of the plurality of fractional blocks. After accumulating all difference values for each fractional pixel, the method may further include calculating a sum of absolute differences value for each of the plurality of fractional blocks. One of the plurality of fractional blocks with the lowest sum of absolute differences value as the best fit pixel match with the current block may then be selected.

A system may be used that is configured to identify a block of fractional pixel data in a reference frame that is a best fit pixel match with a current block of pixel data in a current frame. The system may include a data fetch, a shift register, and one or more processing blocks. The data fetch may receive a best fit integer block, where the best fit integer block is identified by comparing the current block of pixel data to a search area within a reference block of pixel data. The shift register may be configured to load pixel data to be used for performing a fractional pixel expansion for one quadrant corresponding to each integer pixel in a block of pixel data, the block of pixel data including the best fit integer block plus one additional row of integer pixels and one additional column of integer pixels, wherein a combination of all of the one quadrant fractional expansions provides a plurality of fractional blocks for the best fit integer block. The one or more processing blocks may be configured to compare each of the plurality of fractional blocks with the current block to identify a best fit fractional block, the best fit fractional block being the best fit pixel match with the current block.

In another embodiment, a method may be used to identify a block of fractional pixel data in a reference frame that is a best fit pixel match with a current block of pixel data in a current frame, that includes the following steps: (a) comparing the current block of pixel data to a search area within a reference block of pixel data to identify a best fit integer block; (b) defining a block of pixel data that includes the best fit integer block plus one additional row of integer pixels and one additional column of integer pixels; (c) loading a shift register with pixel data from the block of pixel data such that the shift register includes a sufficient number of rows of integer pixels to be used to perform a fractional pixel expansion for one quadrant of each integer pixel in a single row integer pixels; (d) performing the fractional pixel expansion on a first row of integer pixels in the best fit integer block using the pixel data loaded in the shift register and comparing each resultant fractional pixel with one or more pixels in the current block to accumulate difference values for each fractional pixel in the first row of integer pixels; (e) loading one new row of pixel data from the block of pixel data into the shift register; (f) performing the fractional pixel expansion on a next row of integer pixels in the best fit integer block using the newly loaded pixel data in the shift register and comparing each resultant fractional pixel with one or more pixels in the current block to accumulate difference values for each fractional pixel in the next row of integer pixels; (g) repeating steps (e) and (f) until difference values have been accumulated for every fractional pixel in the block of pixel data; and (h) processing the accumulated difference values to identify the block of fractional pixel data that is the best fit pixel match with the current block of pixel data.

DETAILED DESCRIPTION

Figure 4:
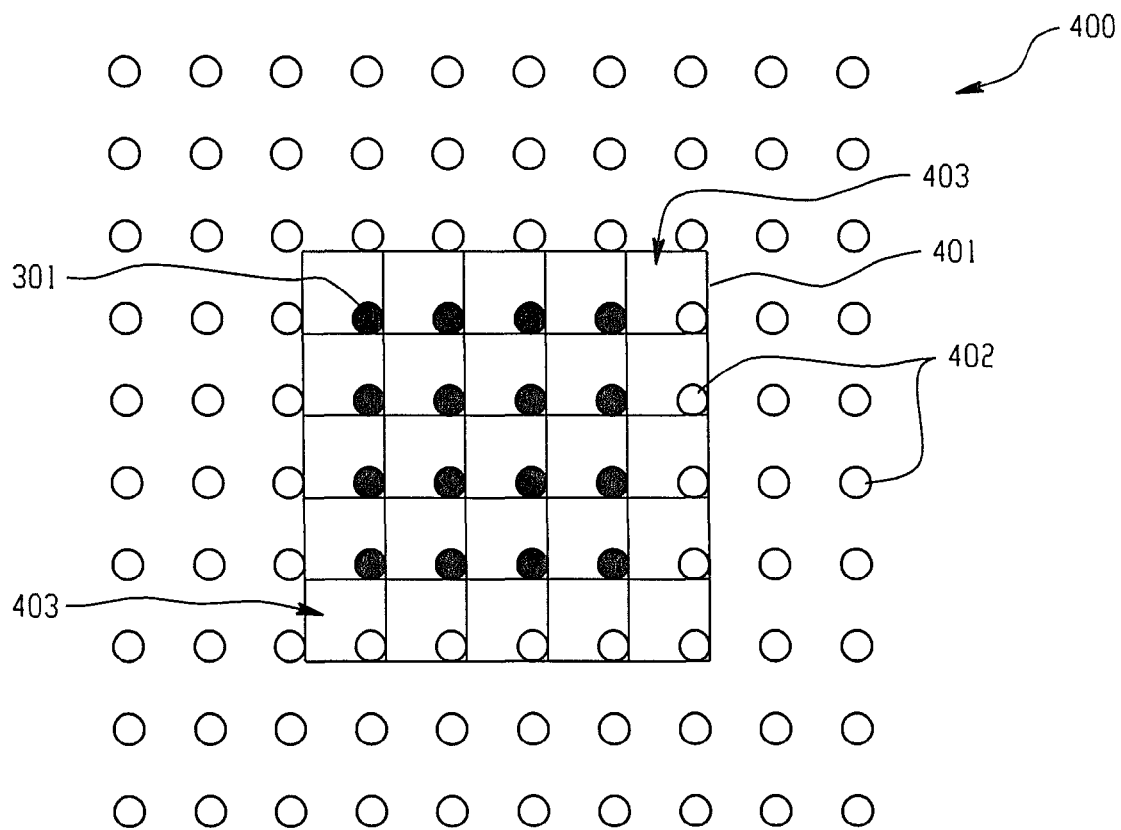
FIG. 4 depicts a 4×4 reference block with surrounding integer pixels, including quadrants used for fractional expansion.
Figure 5:
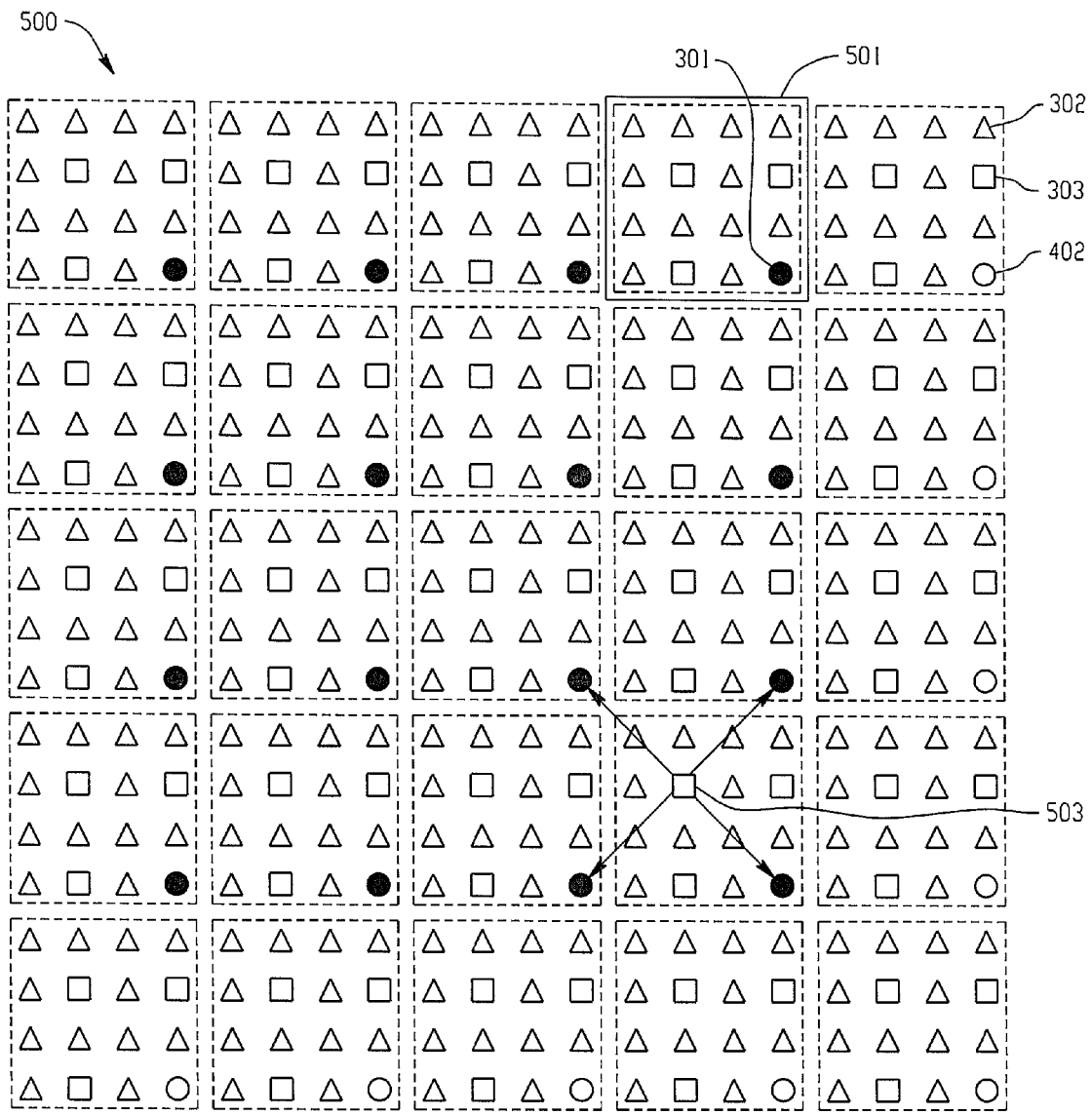
FIG. 5 illustrates a fractional pixel expansion for the block of pixel data in FIG. 4.

FIGS. 4 and 5 illustrate an efficient quadrant fractional pixel expansion for a video motion estimation engine. The process illustrated in FIGS. 4 and 5 enables the selection of a best fit fractional motion vector without generating and processing the same fractional pixel data multiple times. This may be achieved by performing a fractional pixel expansion for only one quadrant corresponding to each of the sixteen integer pixels 301 in a selected block 401 of integer pixel data, where the selected block 401 includes the integer pixels 301 from the best fit integer block along with one additional row and one additional column of integer pixels 403. From this fractional pixel expansion, SAD values may be accumulated for the fractional pixels within each quadrant, and the contribution of the SAD values to each surrounding integer pixel may be processed to provide complete SAD values for each of the fractional motion vectors in the best fit reference block.

Figure 1:
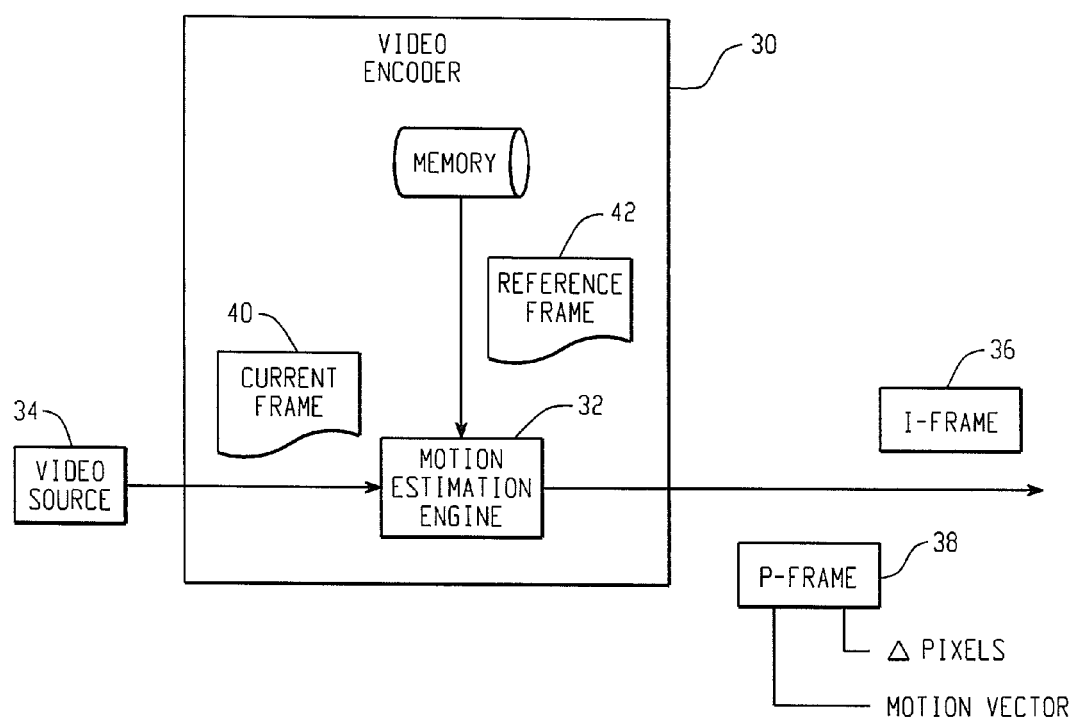
FIG. 1 is a block diagram of a typical video encoder having a motion estimation engine.
Figure 2A:
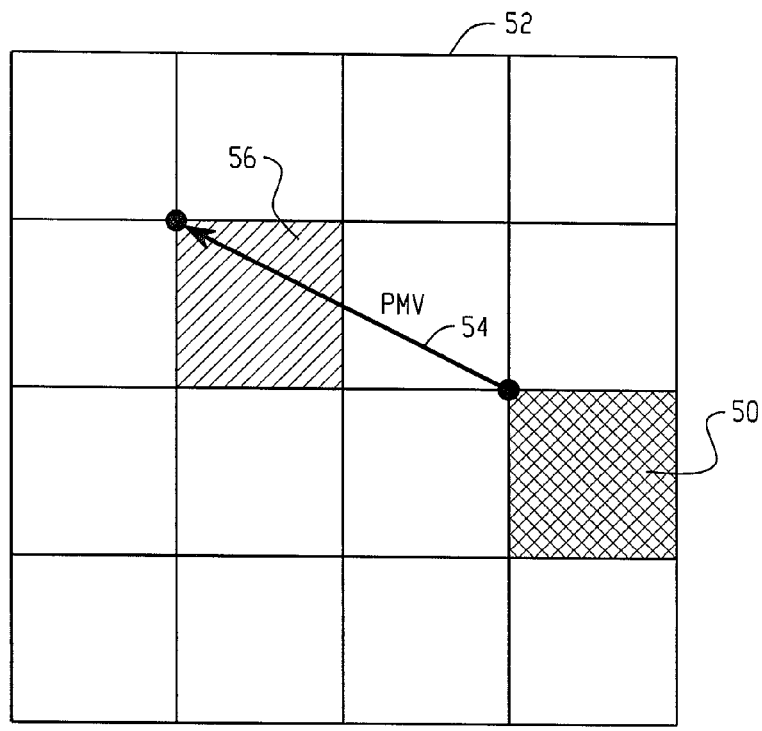
FIGS. 2A-2C illustrate an example process for identifying a best fit pixel match between blocks in a current frame and blocks in a reference frame.
Figure 2B:
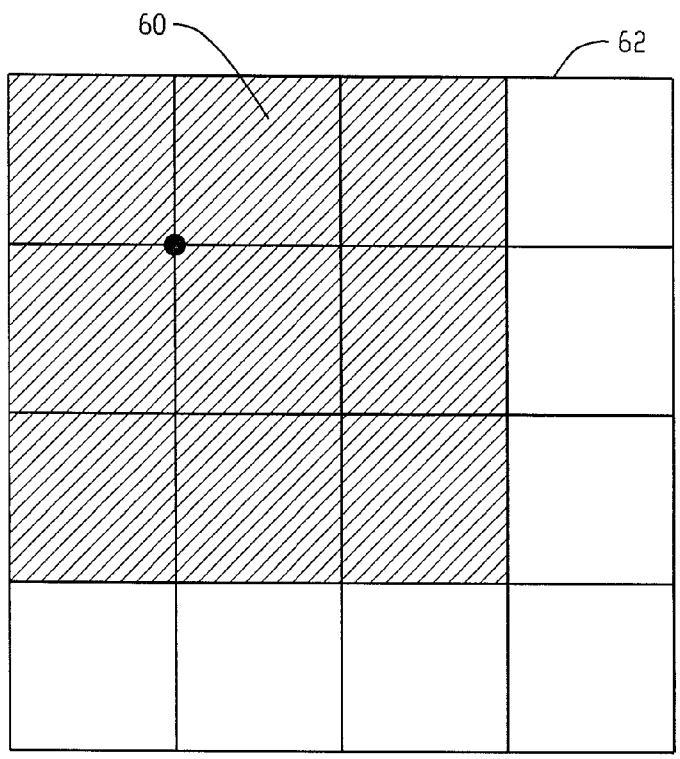
Figure 2C:
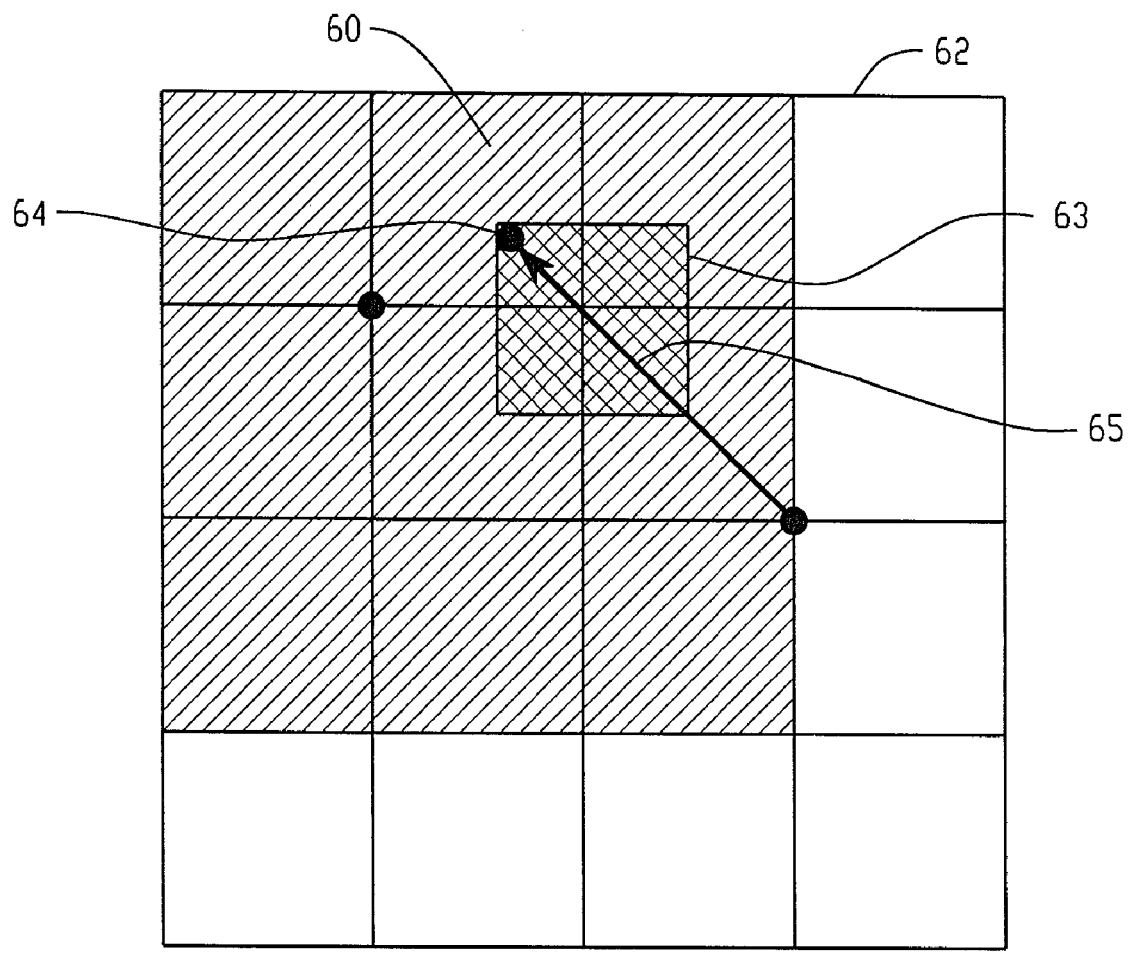
Figure 3:
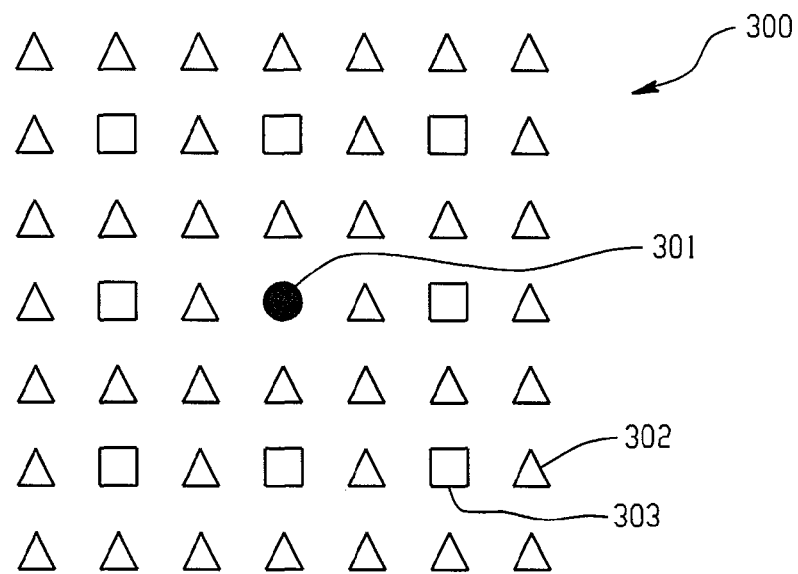
FIG. 3 illustrates an example fractional pixel expansion around an integer pixel.

With reference first to FIG. 4, this figure illustrates the integer pixels that are processed in order to perform an efficient quadrant fractional pixel expansion on a 4×4 reference block of integer pixels 301. The integer pixels 301 in the reference block are depicted in FIG. 4 as solid black circles, and the integer pixels 402 surrounding the reference block are depicted as white circles. The 4×4 reference block of integer pixels 301 may, for example, be selected as a closest pixel match with a current block, as explained above with reference to FIGS. 2A-2C. The block 401 in FIG. 4 encloses the integer pixels on which the quadrant fractional pixel expansion is performed. The integer pixels outside of the block 401 are included in FIG. 4 because they are used in calculating the fractional pixel expansions of the pixels inside of the block 401, as described in more detail below.

In the example illustrated in FIGS. 4 and 5, a fractional pixel expansion is performed for the upper left quadrant of each integer pixel 301 in the reference block along with one extra row and one extra column of integer pixels. In this example, an extra column of integer pixels 403 is included to the right of the reference block 301 and an extra row of integer pixels 403 is included below the reference block 301. As shown in FIG. 5, this provides all of the fractional pixel data (in all four directions) needed to identify the fractional motion vector that most closely matches the current block of pixel data.

It should be understood, that because the quadrant fractional pixel expansion of the extra row and column of integer pixels 403 provides the remaining quadrants for the integer pixels 301 in the reference block, the location of the extra row and column of surrounding integer pixels 403 is dependent on the direction of the fractional pixel expansion. Thus, there are four possible configurations for the extra row and column of integer pixels 403. The extra row and column will be located in the opposite perpendicular direction of the direction of the fractional pixel expansion. In the illustrated example, where the motion vector is pointing to the top left pixel to select the block, the fractional pixel expansion is up and to the left, and thus the extra row and column are included below and to the right of the reference block.

With reference now to FIG. 5, the block of pixel data 401 of FIG. 4, is shown with fractional pixel expansion having been performed, as fractional pixel expansion block 500. Each integer pixel 301 is depicted with its corresponding quarter fractional pixel 302 and half fractional pixel 303 locations. For example, quadrant 501 shows a fractional pixel expansion for a single integer pixel 301. For each integer pixel 301, there are four corresponding quadrants: up and to the left (negative horizontal, negative vertical); up and to the right (positive horizontal, negative vertical); down and to the right (positive horizontal, positive vertical); and down and to the left (negative horizontal, positive vertical). The quadrant 501 selection shown in FIG. 5, up and to the left, is used only as an example to illustrate one possible method of fractional pixel expansion. An advantage, however, of expanding the pixels up and to the left is that the signs of the potential motion vectors can be ignored. Expanding the pixels in any other direction would call for an algorithm to account for the signs of the motion vectors.

As shown in FIG. 5, fractional pixel expansion is performed by expanding up and to the left of the integer pixels 301 of the block 401 of integer pixels depicted in FIG. 4. Each quadrant 501 has fractional pixel expansion performed only once (FIG. 5 depicts twenty-five quadrants). Once all quadrants 501 have been interpolated, the result is the fractional pixel expansion block 500. As shown, each integer pixel 301 has all four corresponding quadrants with fractional pixels 302 and 303, even though only one quadrant 501 was processed for each integer pixel 301 and surrounding integer pixel 402. This method thus reduces the need to process each of the four quadrants independently for every integer pixel 301. For instance, half fractional pixel 503 would be processed a total of four times without utilizing the single-quadrant processing method above, because it corresponds to four different integer pixels.

Figure 6A:
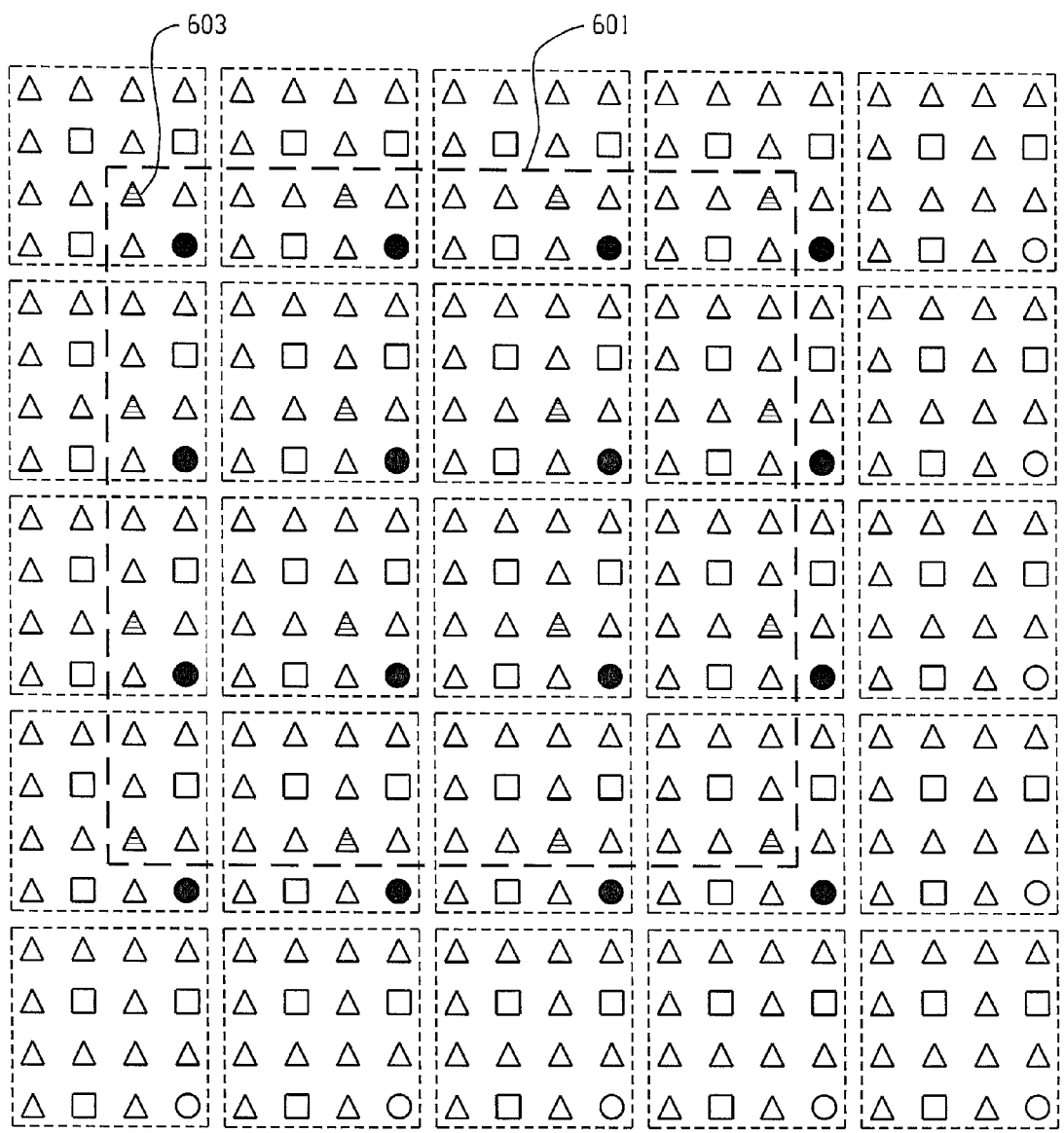
FIGS. 6A and 6B show two fractional pixel block expansions.
Figure 6B:
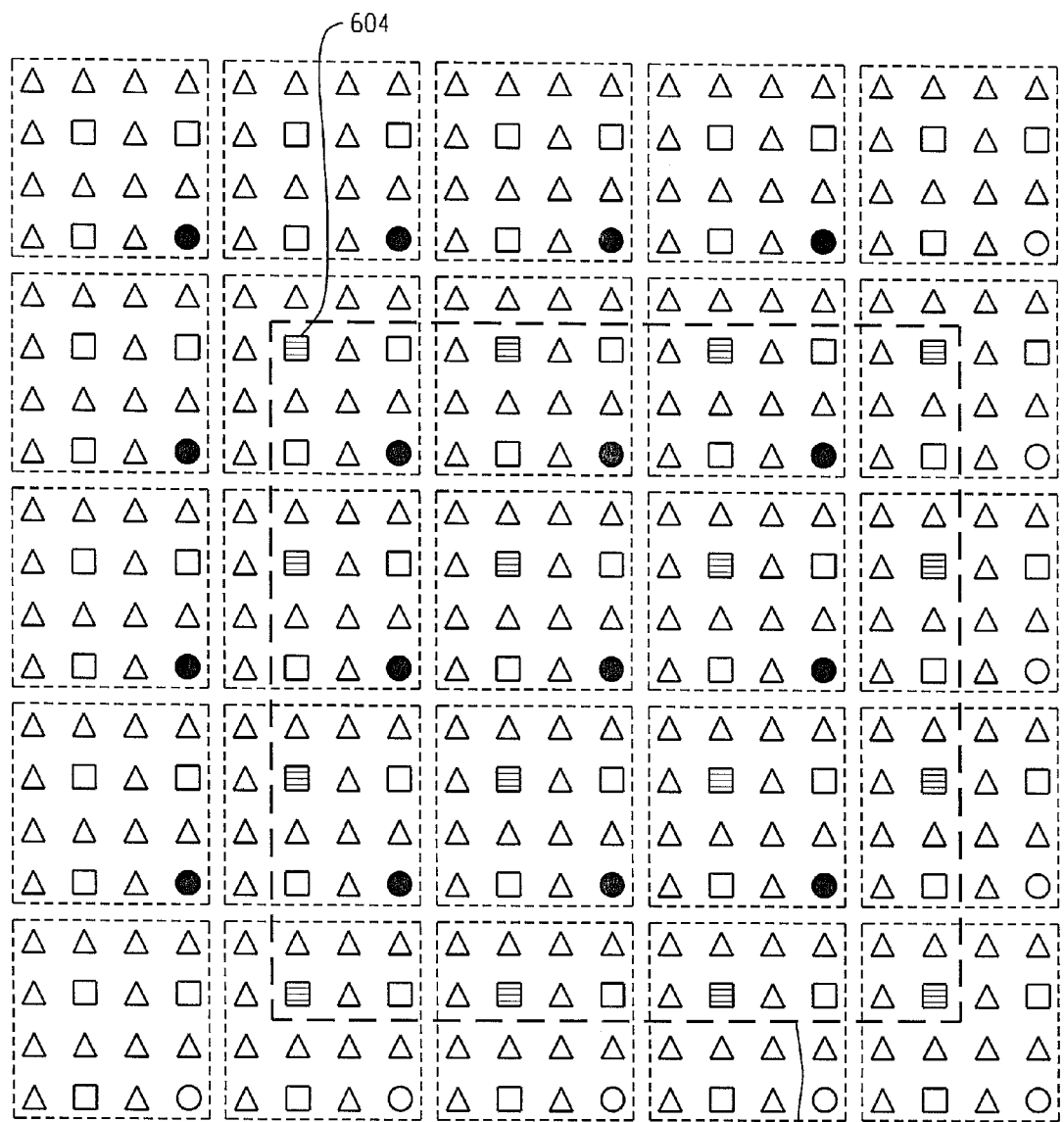

In order to identify the best fit fractional motion vector, the block of pixel data associated with each fractional motion vector (referred to herein as a fractional block) is compared with the block of pixel data in the current block. In the example referenced above, the fractional pixel expansion results in a total of forty-nine reference blocks (forty-eight fractional blocks and one integer block) that are compared with the current block to identify the closest pixel fit. To help illustrate this, FIGS. 6A and 6B show two of the forty-eight fractional blocks (601 and 602) that are compared with the current block. FIG. 6A illustrates the fractional block 601, which corresponds to the fractional motion vector pointing to quarter pixel location 603. The fractional block 601 includes the sixteen quarter pixel locations identified by the shaded triangles. In FIG. 6B, another fractional block 602 is illustrated, which corresponds to the fractional motion vector pointing to half pixel location 604. The fractional block 602 in FIG. 6B includes the sixteen half pixel locations, identified by the shaded squares.

One method of comparing the fractional pixel blocks to the current block is to calculate the sum of absolute differences between them. The SAD calculation is performed by comparing each fractional pixel in a fractional block to each corresponding pixel in the current block. The SAD calculation for an entire fractional pixel block may be determined by totaling each difference value for all pixel locations in the fractional block. The fractional pixel block with the closest pixel match to the current block is the fractional pixel block with the lowest SAD value. The motion vector location corresponding to the fractional pixel block with the closest pixel match to the current block may then be selected.

Figure 7A:
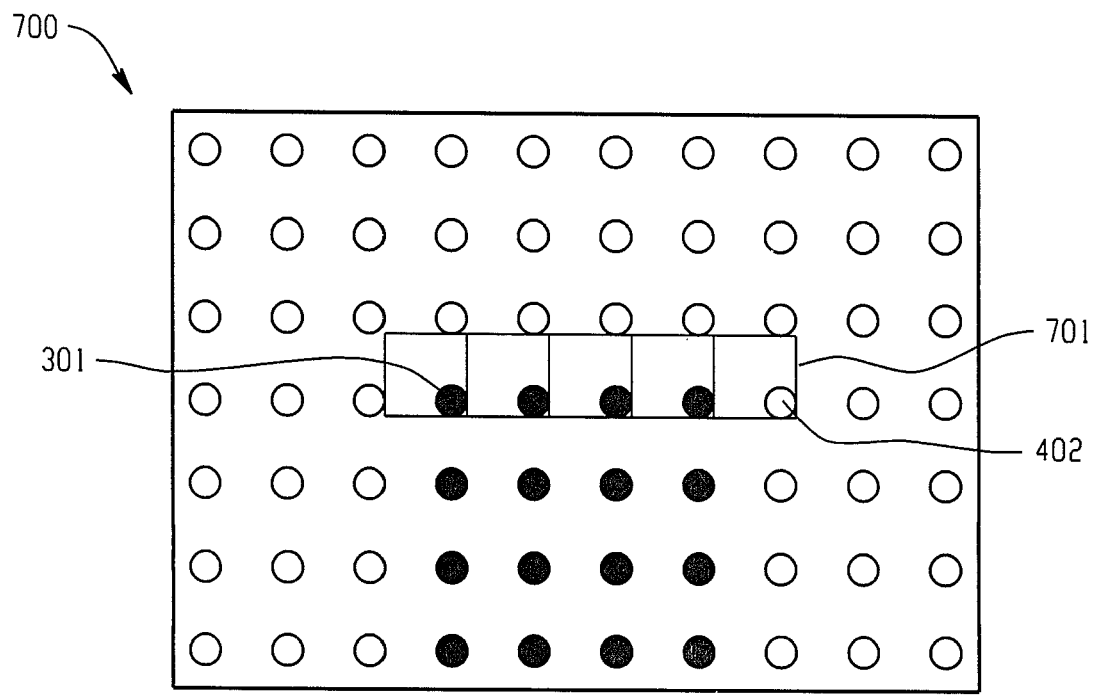
FIGS. 7A and 7B illustrate strides of pixel data loaded into a shift register.
Figure 7B:
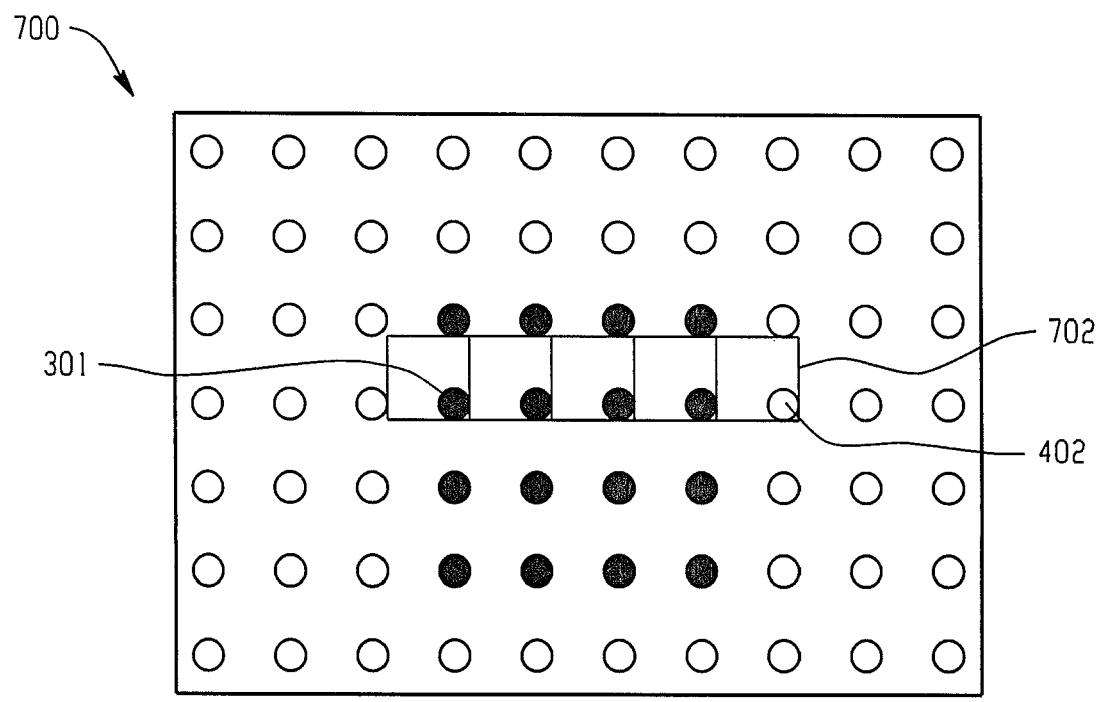
Figure 8:
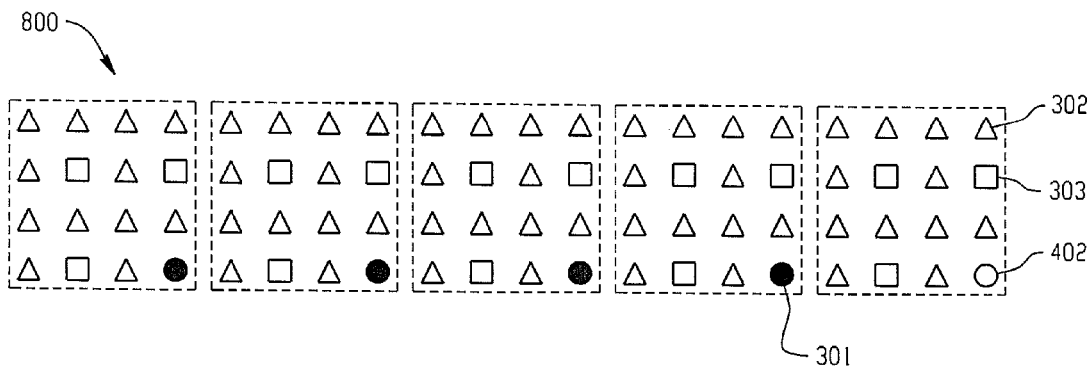
FIG. 8 depicts an interpolated stride of pixel data.

FIGS. 7A, 7B, and 8 show an example method of using a 10×7 shift register to efficiently perform fractional motion estimation on a block of pixel data. This method may, for example, be used with the block of pixel data shown in FIG. 4. FIGS. 7A and 7B illustrate how pixel data may be loaded into a shift register 700 and processed to perform the fractional pixel expansions and to accumulate SAD values for the resultant fractional pixels. In FIG. 7A, the shift register 700 is initially loaded with seven rows of pixel data in order to perform the fractional pixel expansions for the first row of pixel data 701 in the reference block. The calculations of the fractional pixel expansions are explained in more detail below with reference to FIGS. 9 and 10.

Once the first row of pixel data 701 has been expanded, each fractional pixel in the row may be compared to pixels in the current block to accumulate SAD values for each pixel location, as explained in more detail below. After the first row of pixel data 701 has been processed, the shift register then loads another stride of pixel data in order to interpolate the fractional pixels and accumulate the SAD values for the next row of pixel data 702 in the reference block, as shown in FIG. 7B. The shift register repeats this process, loading one stride of data at a time, until each row of pixel data in the reference block has been processed.

FIG. 8 depicts a stride of pixel data 701 following the fractional pixel expansion in the shift register 700. The interpolated data stride 800 is shown with one quadrant of half fractional pixels 303 and quarter fractional pixels 302 that correspond to each integer pixel 301. For each stride of pixel data 701 processed in the shift register 700, there is a corresponding interpolated data stride 800. When each interpolation is complete, the interpolated data strides 800, if placed together, would resemble the fractional pixel expansion block 500 of FIG. 5. No data is fetched twice to process a block.

Because each fractional pixel 302 and 303 in the interpolated data stride 800 may correspond to more than one integer pixel 301 (see e.g., fractional pixel 503 in FIG. 5), a method may be used to store the fractional pixel 302 and 303 locations as they correspond to each integer pixel 301 to be retrieved for later use. One method of tracking which fractional pixels 302, 303 correspond to each integer pixel 301 is to map each fractional pixel 302, 303 to its corresponding integer pixel 301. Each fractional pixel is mapped according to its corresponding integer pixel 301 along with its location relative to that integer pixel 301. When a fractional pixel is mapped to each integer pixel, a SAD calculation may be performed to its corresponding pixel location in the current block. For example, in FIG. 5, fractional pixel 503 would have a SAD calculated for each of the four corresponding pixel locations in the current block that are pointed to in FIG. 5. Fractional pixel 503 corresponds to four different integer pixels 301, and therefore, can represent a different pixel location in four fractional blocks. Therefore, calculating a SAD for all corresponding pixel locations for each fractional pixel in each row of pixel data in the reference block, while loaded in the shift register, allows for a total SAD value for each fractional block to be calculated and compared to determine the lowest SAD. A total SAD value for each fractional block can be calculated by summing each SAD value for each fractional pixel in the block. These calculations can be performed with the data collected during the mapping of each fractional pixel.

Figure 9:
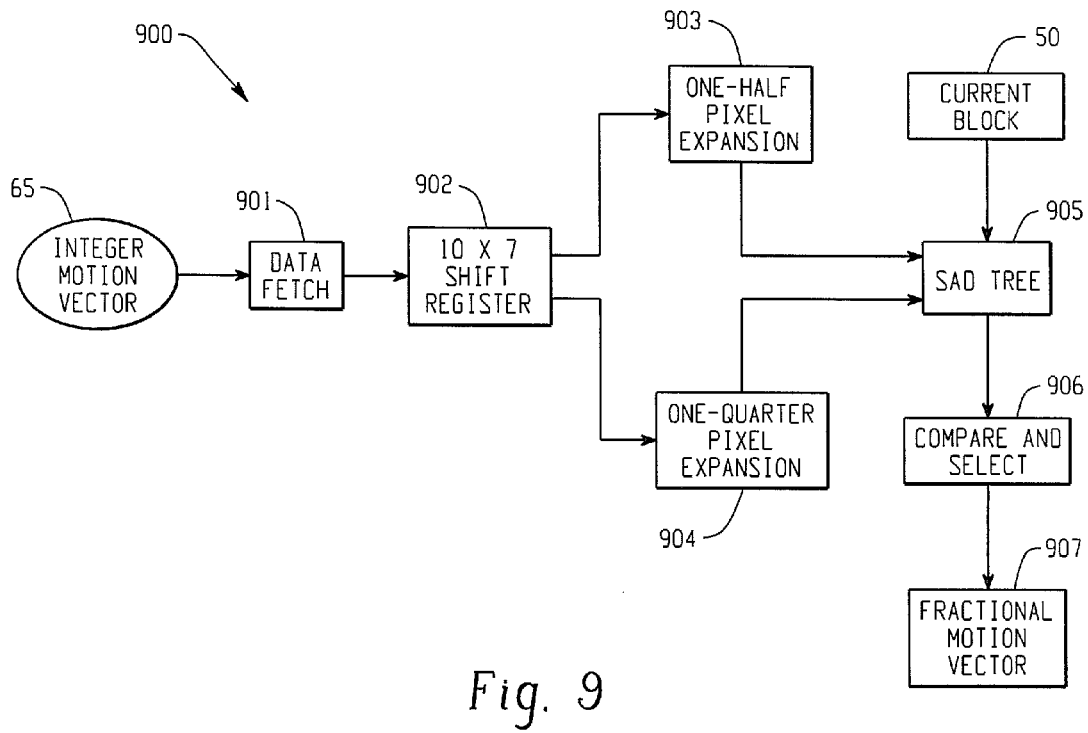
FIG. 9 is a block diagram depicting an example fractional motion estimation system.

FIG. 9 is a block diagram depicting an example fractional motion estimation system 900 that may utilize the fractional expansion method described above. The fractional pixel expansion system 900 includes a data fetch 901 that receives the integer motion vector 65. The data fetch 901 feeds the 10×7 shift register 902, which then provides data for a one-half pixel expansion block 903 and a one-quarter pixel expansion block 904. The outputs of the one-half and one-quarter pixel expansion blocks 903, 904 are provided to the SAD tree 905 for mapping each fractional pixel location, calculating each fractional pixel's SAD values, and accumulating the SAD values and pixel locations. The SAD tree 905 also receives the current block 50. A compare and select block 906 compares the data for each fractional block SAD value against the SAD value for the reference block, and identifies the block with the lowest SAD value as the fractional motion vector 907.

In operation, the 10×7 shift register 902 receives strides of pixel data corresponding to the block of pixel data 401, as shown in FIG. 4. Using the expanded pixel data block 400 in FIG. 4 as an example, the 10×7 shift register 902 receives a total of five successive strides of pixel data to perform all of the fractional pixel interpolations for the block of pixel data 401. When the 10×7 shift register 902 receives a stride of pixel data, it provides the data to the one-half pixel expansion block 903 and the one-quarter pixel expansion block 904 for the fractional pixel expansions to be performed. An example of how the fractional pixel expansions may be calculated is provided below in reference to FIG. 10.

After all fractional pixel interpolations have been performed on a row of pixel data, the one-half pixel expansion block 903 and the one-quarter pixel expansion block 904 send the interpolated pixel locations to the SAD tree 905, which maps and accumulates the SAD values for each fractional pixel in the row. The one-half pixel expansion block 903 and the one-quarter pixel expansion block 904 then receive the next stride of pixel data from the 10×7 shift register 902 and perform the fractional pixel expansions.

As the SAD tree 905 receives each interpolated stride of pixel data, it calculates the SAD value for each fractional pixel in the stride of pixel data at each of its corresponding pixel locations. As explained above, several fractional pixels will constitute a different pixel location in multiple fractional blocks and, therefore, need to be compared to multiple pixel locations in the current block 50. Therefore, the SAD tree 905 maps each fractional pixel to its corresponding integer pixels and identifies the SAD value for each contribution of the fractional pixel to a surrounding integer pixel. The SAD tree 905 then accumulates the total SAD value for each fractional pixel block and sends the forty-eight values to the compare and select block 906. The compare and select block 906 compares the SAD values for each fractional pixel block and the reference block to determine the block with the lowest SAD value. The block with the lowest SAD value is sent to the fractional motion vector block 907, which is the output of the fractional motion estimation system 900. Fractional motion vector 907 corresponds to an integer pixel, quarter fractional pixel, or half integer pixel of the fractional pixel block selected as the closest pixel match to the current block 50.

It should be understood that the system blocks shown in FIG. 9, as well as the system blocks set forth in the other system diagrams described herein, may be implemented using software, hardware, or a combination of software and hardware components. In addition, hardware components for one or more of the system blocks may be implemented in a single integrated circuit or using multiple circuit components.

Figure 10:
FIG. 10 illustrates pixel data used in calculating fractional pixel expansions, H264.
Figure 10:
Figure 10:
Figure 10:
Figure 10:
Figure 10:
Figure 10:
Figure 10:
Figure 10:
Figure 10:
Figure 10:
Figure 10:
Figure 10:
Figure 10:
Figure 10:
Figure 10:

FIG. 10 shows one example of the fractional pixel expansion calculations performed by the one-half pixel expansion block 903 and the one-quarter pixel expansion block 904 of FIG. 9. The one-half pixel expansion block 903 and the one-quarter pixel expansion block 904 are provided for the stride of pixel data to be interpolated from the 10×7 shift register 902, along with the extra pixel data (shown in FIGS. 7A and 7B) used to perform the calculations. In FIG. 10, the stride of pixel data is represented by upper-case letters K, L, M, N, and P. In this example, the fractional pixel calculations will be processed for integer pixel N. The lower-case letters a, c, d, e, f, g, i, k, n, p, q, and r represent quarter fractional pixel locations. The lower-case letters b, h, j, m, and s represent half fractional pixel locations. Lower-case letters aa, bb, cc, dd, ee, ff, gg, and hh represent half fractional pixel locations for integer pixels that are used to perform the calculations for integer pixel N. The first fractional pixel locations calculated are b, h, m, and s. A 6-tap filter is applied in the horizontal direction to calculate b1 and a 6-tap filter is applied in the vertical direction to calculate h1, as follows:

$$b1=(E-5*F+20*G+20*H-5*I+J);$$

$$h1=(A-5*C+20*G+20*M-5*R+T);$$

$$m1=(B-5*D+20*H+20*N-5*S+U);$$

$$b1=(K-5*L+20*M+20*N-5*P+Q).$$

After b1, h1, m1, and s1 values are calculated, the values for b, h, m, and s can be found:

$$b=\text{Clip1}Y((b1+16)\gg 5);$$

$$h=\text{Clip1}Y((h1+16)\gg 5);$$

$$m=\text{Clip1}Y((m1+16)\gg 5);$$

$$s=\text{Clip1}Y((s1+16)\gg 5).$$

The last half fractional pixel location for integer pixel N to be calculated is j. Fractional pixel location j is calculated by first finding j1. j1 can be calculated using either the horizontal or the vertical 6-tap filter. The values aa, bb, cc, dd, ee, ff, gg, and hh are calculated in the same manner as half fractional pixel locations b, h, m, and s from above:

$$j1=cc-5*dd+20*h1+20*m1-5*ee+ff;$$

$$j1=aa-5*bb+20*b1+20*s1-5*gg+hh.$$

The half fractional pixel location j can then be calculated using the j1 value from above:

$$j=\text{Clip1}Y((j1+512)\gg 10).$$

After all half fractional pixel locations for integer pixel N have been determined, the calculations for quarter fractional pixel locations a, c, d, e, f, g, i, k, n, p, q, and r can be performed. The values for quarter fractional pixel locations are derived by averaging with upward rounding of the two nearest fractional and integer pixel locations as follows:

$a=(G+b+1)>>1;$ $c=(H+b+1)>>1;$ $d=(G+h+1)>>1;$ $n=(M+h+1)>>1;$ $f=(b+j+1)>>1;$ $i=(h+j+1)>>1;$ $k=(j+m+1)>>1;$ $q=(j+s+1)>>1;$ $t=(H+m+1)>>1;$ $u=(N+m+1)>>1;$ $v=(M+s+1)>>1;$ $w=(N+s+1)>>1;$ $e=(b+h+1)>>1;$ $g=(b+m+1)>>1;$ $p=(h+s+1)>>1;$ $r=(m+s+1)>>1.$

Figure 11:
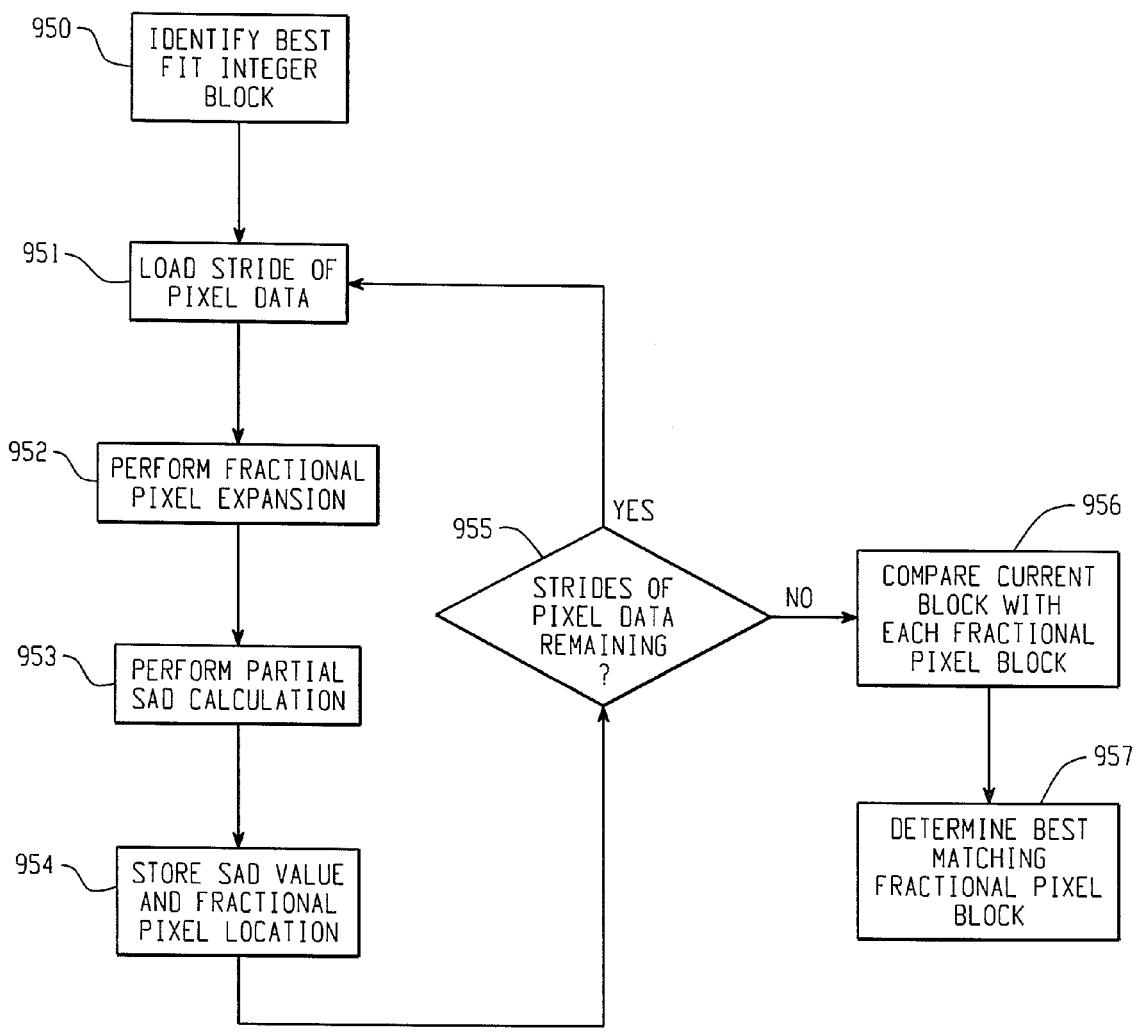
FIG. 11 is a flow diagram of an example fractional motion estimation method.

FIG. 11 is a flow diagram of an example fractional pixel expansion method. At step 950, an integer block is identified that is a closest pixel match with the current block. At step 951, strides of pixel data are loaded into a shift register. The shift register is initially loaded with extra rows and columns of pixel data that are used to perform fractional pixel expansions for a row of integer pixel data in a reference block, for example as described above with reference to FIGS. 7A, 7B and 8. At step 952, fractional pixel expansions are performed on one quadrant of each integer pixel and surrounding integer pixel included in one row of pixel data loaded into the shift register. Following the fractional pixel expansions, one or more SAD calculations are performed on each quarter fractional pixel and on each half fractional pixel in the row, at step 953. At step 954, the one or more SAD calculations for each quarter fractional pixel and for each half fractional pixel are stored with information identifying a location of the fractional pixel relative to an integer pixel, such that the one or more SAD calculations for each fractional pixel may be associated with a particular fractional block for accumulation.

At step 955, the method determines whether all data in the integer pixel block has been loaded in the shift register and interpolated. If a stride of pixel data has not been loaded into the shift register, then the method returns to step 951 and the next available stride of pixel data is loaded into the shift register. If step 955 determines that all strides of pixel data have been loaded into the shift register and interpolated, then the method proceeds to step 956. In step 956, the current block is compared with each fractional pixel block to determine the closest pixel match. In doing the comparison, the method retrieves the stored data for each fractional pixel that includes its location relative to each integer pixel and its SAD calculation. From that data, step 956 can determine which fractional pixels correspond to each fractional pixel block, and calculate a total SAD value for each fractional pixel block.

At step 957, the fractional block that has the lowest SAD value as compared to the current block is selected as the closest pixel match. The output of step 957 is a motion vector pointing to the fractional pixel or integer pixel that identifies the best match fractional pixel block.

This written description uses examples to disclose the invention, including the best mode, and also to enable a person skilled in the art to make and use the invention. The patentable scope of the invention may include other examples that occur to those skilled in the art.

It is claimed:

1. A method for identifying a block of fractional pixel data in a reference frame that is a best fit pixel match with a current block of pixel data in a current frame, the method comprising steps of:
    comparing the current block of pixel data to a search area within a reference block of pixel data to identify a best fit integer block;
    for each integer pixel in a block of pixel data that includes the best fit integer block plus i) one additional row of integer pixels and ii) one additional column of integer pixels, performing a fractional pixel expansion for one quadrant corresponding to each integer pixel in the block of pixel data, such that a combination of all of the one quadrant fractional pixel expansions provides a plurality of fractional blocks for the best fit integer block; and
    comparing each of the plurality of fractional blocks to the current block to identify a best fit fractional block, the best fit fractional block being the best fit pixel match to the current block, wherein the comparison of each of the plurality of fractional blocks to the current block results in one or more difference values for each fractional pixel that are stored with information identifying a location of the fractional pixel within the block of pixel data and associating the one or more difference values with particular ones of the plurality of fractional blocks,
    wherein the steps of the method are performed by video encoder hardware.

2. The method of claim 1, wherein the fractional pixel expansion is performed on one row of the block of pixel data at a time.

3. The method of claim 2, wherein the comparison of each of the plurality of fractional blocks to the current block is performed by comparing pixel data in the current block with fractional pixels in one row of the block of pixel data at a time.

4. The method of claim 1, further comprising, after accumulating all difference values for each fractional pixel, calculating a sum of absolute differences value for each of the plurality of fractional blocks.

5. The method of claim 4, further comprising selecting one of the plurality of fractional blocks with the lowest sum of absolute differences value as the best fit pixel match with the current block.

6. The method of claim 1, wherein the video encoder hardware is an integrated circuit.

7. The method of claim 1, wherein the video encoder hardware includes a processor configured to execute video encoder software instructions.

8. A system for identifying a block of fractional pixel data in a reference frame that is a best fit pixel match with a current block of pixel data in a current frame, the system comprising:
    a data fetch configured to receive a best fit integer block, wherein the best fit integer block is identified by comparing the current block of pixel data to a search area within a reference block of pixel data;
    a shift register configured to load pixel data to be used for performing a fractional pixel expansion for one quadrant corresponding to each integer pixel in a block of pixel data, the block of pixel data including the best fit integer block plus i) one additional row of integer pixels and ii) one additional column of integer pixels, wherein a combination of all of the one quadrant fractional expansions provides a plurality of fractional blocks for the best fit integer block; and one or more processing blocks configured to compare each of the plurality of fractional blocks with the current block to identify a best fit fractional block, the best fit fractional block being the best fit pixel match with the current block, wherein one or more difference values for each fractional pixel are stored with information identifying a location of the fractional pixel within the block of pixel data and associating the one or more difference values with particular ones of the plurality of fractional blocks.

9. The system of claim 8, wherein the fractional pixel expansion is performed on one row of the block of pixel data at a time.

10. The system of claim 9, wherein the comparison of each of the plurality of fractional blocks to the current block is performed by comparing pixel data in the current block with fractional pixels in one row of the block of pixel data at a time.

11. The system of claim 10, wherein the shift register is initially loaded with pixel data to be used to perform the fractional pixel expansions for one row of integer pixels in the block of pixel data, and thereafter one stride of pixel data is loaded into the shift register to be used to perform fractional pixel expansions for each additional row of integer pixels in the block of pixel data.

12. The system of claim 8, wherein the one or more processing block are further configured to calculate a sum of absolute differences value for each of the plurality of fractional blocks after accumulating all difference values for each fractional pixel.

13. The system of claim 12, wherein the one or more processing blocks are configured to select one of the plurality of fractional blocks with the lowest sum of absolute differences value as the best fit pixel match with the current block.

14. A method for identifying a block of fractional pixel data in a reference frame that is a best fit pixel match with a current block of pixel data in a current frame, the method comprising:

(a) comparing the current block of pixel data to a search area within a reference block of pixel data to identify a best fit integer block;

(b) defining a block of pixel data that includes the best fit integer block plus one additional row of integer pixels and one additional column of integer pixels;

(c) loading a shift register with pixel data from the block of pixel data such that the shift register includes a sufficient number of rows of integer pixels to be used to perform a fractional pixel expansion for one quadrant of each integer pixel in a single row integer pixels;

(d) performing the fractional pixel expansion on a first row of integer pixels in the best fit integer block using the pixel data loaded in the shift register, and comparing each resultant fractional pixel with one or more pixels in the current block to accumulate difference values for each fractional pixel in the first row of integer pixels, wherein the difference values are accumulated by storing the difference values for each fractional pixel with information identifying a location of the fractional pixel within the block of pixel data and associating each difference value with a particular block of fractional pixel data;

(e) loading one new row of pixel data from the block of pixel data into the shift register;

(f) performing the fractional pixel expansion on a next row of integer pixels in the best fit integer block using the newly loaded pixel data in the shift register, and comparing each resultant fractional pixel with one or more pixels in the current block to accumulate difference values for each fractional pixel in the next row of integer pixels;

(g) repeating steps (e) and (f) until difference values have been accumulated for every fractional pixel in the block of pixel data; and (h) processing the accumulated difference values to identify the block of fractional pixel data that is the best fit pixel match with the current block of pixel data.

15. The method of claim 14, wherein the block of fractional pixel data having a lowest sum of absolute differences is selected as the best fit pixel match with the current block of pixel data.

* * * * *